Figure 4:
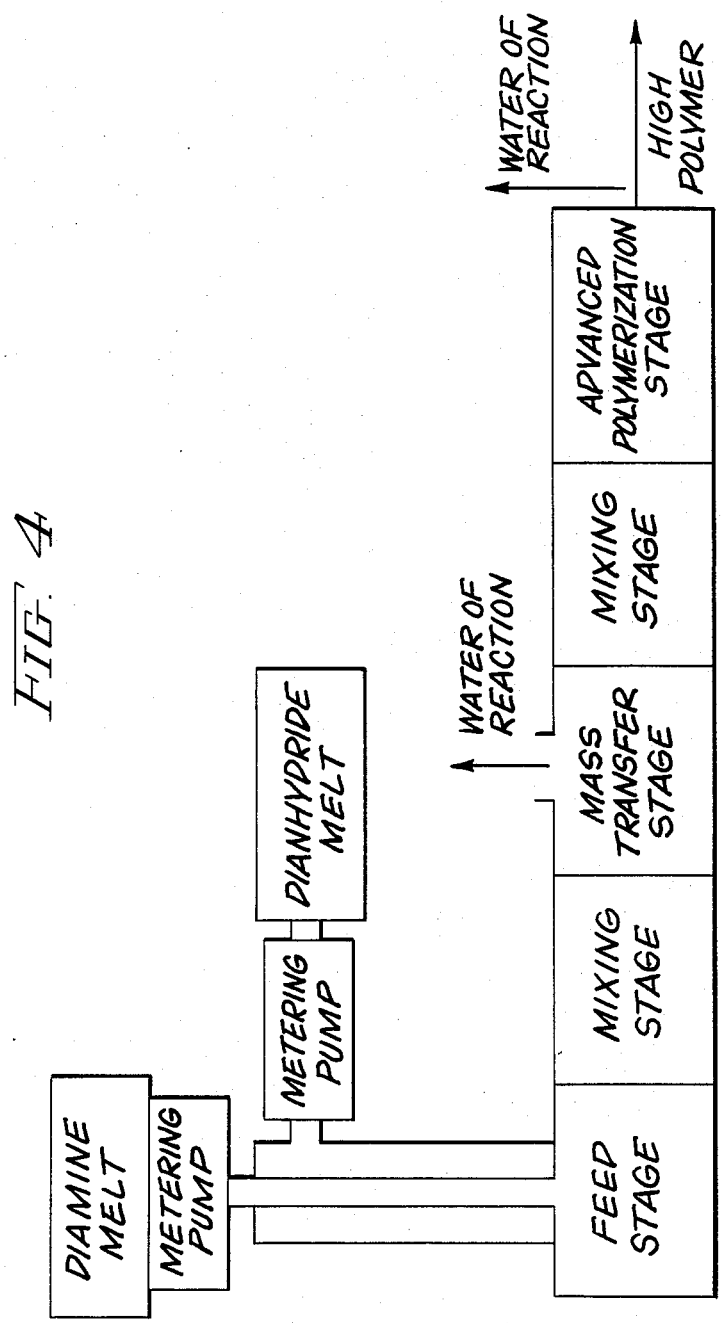

United States Patent [19]

Schmidt et al.

[11] Patent Number: 4,511,535
[45] Date of Patent: Apr. 16, 1985

[54] LIQUID MONOMER FEED PIPE FOR CONTINUOUS EXTRUSION POLYMERIZATION

[75] Inventors: Lawrence R. Schmidt, Schenectady; Eric M. Lovgren, Westerlo, both of N.Y.

[73] Assignee: General Electric Company, Schenectady, N.Y.

[21] Appl. No.: 459,851

[22] Filed: Jan. 21, 1983

[51] Int. Cl.³ .............................................. B01F 15/02
[52] U.S. Cl. .................................... 422/137; 366/178; 366/322; 422/229
[58] Field of Search ...................... 422/135, 137, 229; 366/76, 162, 178, 322; 425/381.2

[56] References Cited

U.S. PATENT DOCUMENTS

| | | |
|---|---|---|
| 2,802,648 | 8/1957 | Christensen et al. . |
| 2,863,649 | 12/1958 | Grubb et al. . |
| 3,148,412 | 9/1964 | Spreeuwers . |
| 3,228,065 | 1/1966 | Cournoyer ............................. 366/76 |
| 3,430,924 | 3/1969 | Hosokawa ...................... 366/178 X |
| 3,477,698 | 11/1969 | Smith et al. ...................... 366/178 X |
| 3,972,902 | 8/1976 | Heath et al. . |
| 4,011,198 | 3/1977 | Takekoshi . |
| 4,073,773 | 2/1978 | Banucci et al. . |
| 4,135,882 | 1/1979 | Harkness et al. . |
| 4,224,282 | 9/1980 | Steinert et al. . |
| 4,263,166 | 4/1981 | Adams . |
| 4,334,784 | 6/1982 | Engels ................................... 366/76 |

Primary Examiner—Barry S. Richman
Assistant Examiner—William R. Johnson
Attorney, Agent, or Firm—William A. Teoli; James C. Davis, Jr.; James Magee, Jr.

[57] ABSTRACT

A feed pipe is provided for introducing highly reactive monomers into a continuous reactor to effect polymerization of such reactive monomers. The feed pipe has concentric tubes forming a central flow channel and an annular flow channel which are sized to insure laminar flow within said tubes. The feed pipe is particularly useful for feeding melts of organic dianhydride and organic diamine into an extrusion reactor for polyetherimide preparation.

6 Claims, 4 Drawing Figures

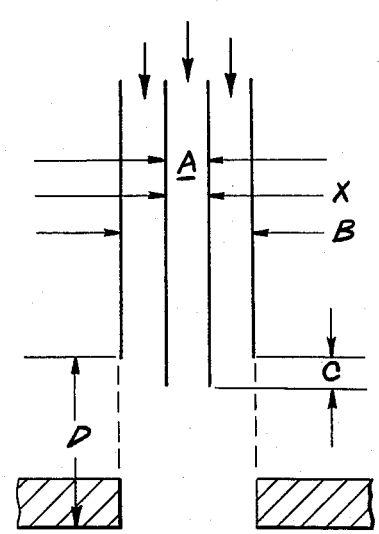
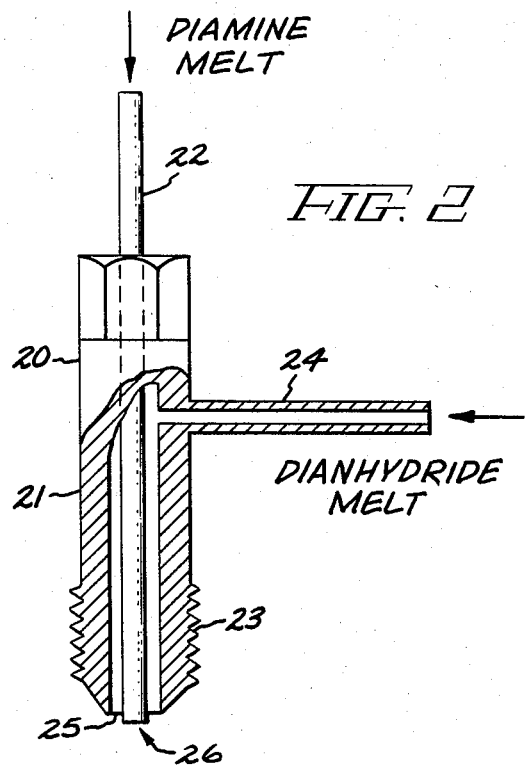
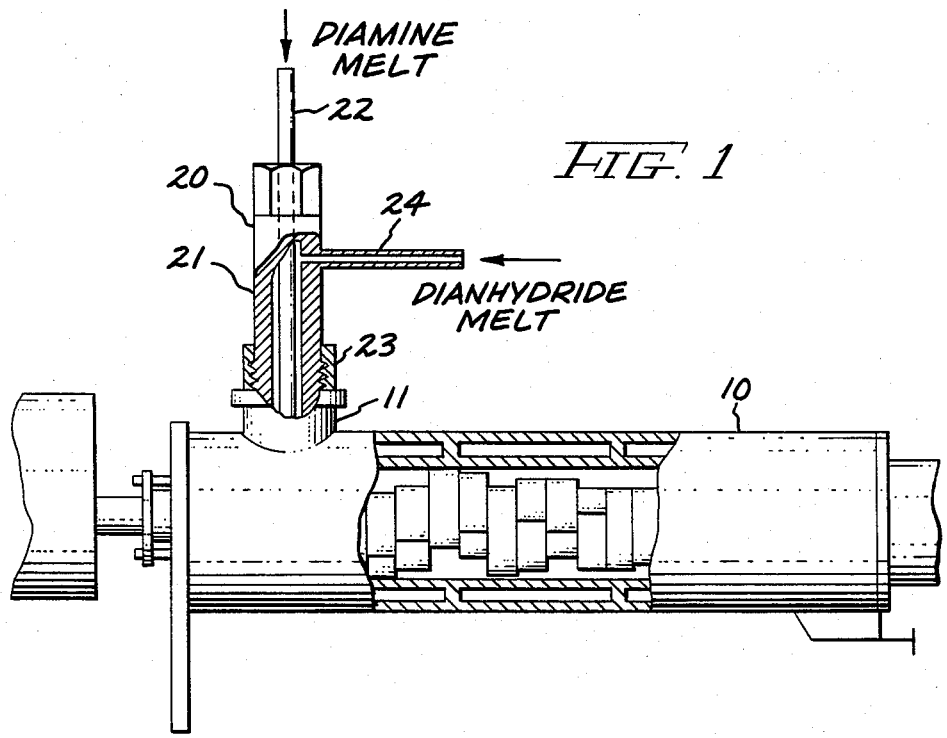
FIG. 3
FIG. 2
FIG. 1

LIQUID MONOMER FEED PIPE FOR CONTINUOUS EXTRUSION POLYMERIZATION

CROSS REFERENCE TO RELATED APPLICATIONS

Reference is made to copending applications of Lawrence R. Schmidt et al, Ser. No. 459,849, now U.S. Pat. No. 4,443,591 and Ser. No. 459,850, now U.S. Pat. No. 4,443,592 filed concurrently herewith, incorporated herein by reference and assigned to the same assignee as the present invention.

BACKGROUND OF THE INVENTION

Prior to the present invention feed pipe devices were available for dispensing liquid feed components into a cavity for the purpose of coreacting such components. For example, Harkness et al U.S. Pat. No. 4,135,882, shows a nozzle for injecting ingredients into a cavity resulting in the production of urea-formaldehyde foam insulation. A concentric feed pipe is utilized in which the foaming agent is coaxially delivered with respect to an axially extending resin injector. Mixing of the foaming agent takes place in a mixing chamber in the form of a detachable hose away from the nozzle to preclude the nozzle from being clogged. A means is applied to the end of the inner concentric tube to impose a direction and speed on the resin.

A machine for proportioning and mixing two or more liquids and semifluid materials and means for dispensing the resulting mixture is shown by Christensen et al, U.S. Pat. No. 2,802,648. A component of the Christensen et al machine is a device with concentric feed tubes. A screw extruder having an attached eccentric feed element is further shown by Spreeuwers, U.S. Pat. No. 3,148,412.

Adams, U.S. Pat. No. 4,263,166, describes a spray foam insulation gun having a mixing chamber and a resin feed pipe passing concentrically through the mixing chamber. The feed pipe extends beyond a nipple so as to allow resin to impinge with foaming agent at a point beyond the nozzle of the spray gun to prevent clogging of the spray gun nozzle.

A concentric feed element used with a screw extruder is shown by Grubb et al, U.S. Pat. No. 2,863,649. No criticality is shown for the relative location of the concentric tubes and the screws of the extruder. The patent also describes blocking means for the central tube. Steinert et al, U.S. Pat. No. 4,224,282, further shows a concentric feed pipe element for introducing material into a high pressure polymerization autoclave.

Although the aforementioned patents describe feed pipes for dispensing liquids and semi-fluid materials and the simultaneous introduction in a concentric stream into a mixing chamber, there is no teaching of a concentric feed pipe for polymerizing monomers in the molten state at temperatures exceeding 200° C. In addition, there is no teaching in the prior art of a concentric feed pipe device capable of separately introducing highly reactive monomers into an extruder at temperatures exceeding 200° C. Further there is no teaching in the prior art of a concentric feed pipe device which allows for the introduction of liquid monomers at elevated temperatures into a reactor where the feed pipe device must provide means for producing a shield resulting from the flow pattern of one of the reactive fluid monomers to protect the other reactive monomer in the fluid state from undue oxidation prior to contact between the two fluid monomers under reaction conditions in the reactor.

STATEMENT OF THE INVENTION

There is provided by the present invention a feed pipe for introducing highly reactive monomers in the liquid state into a reactor comprising (a) a first hollow tube;

(b) a second hollow tube placed concentrically within said first hollow tube, said second hollow tube having a central fluid flow channel and the placement of said second hollow tube within said first hollow tube defining an annulus providing a second fluid flow channel;

(c) mounting means on said first hollow tube for mechanically joining said feed pipe to said reactor, where the first hollow tube and the second hollow tube placed concentrically within said first hollow tube are provided in such dimensions within the feed pipe structure that laminar flow of fluids within the fluid flow channels resulting therefrom is insured.

As shown in copending application No. RD-13291, the feed pipe of the present invention can be used to effect the polymerization of organic dianhydride having the formula,

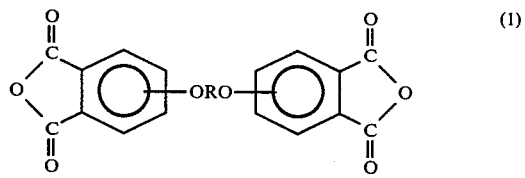

and organic diamine having the formula,

where the aforementioned monomers are fed into an extruder in the molten state to produce high molecular weight polyetherimide, where R is a member selected from

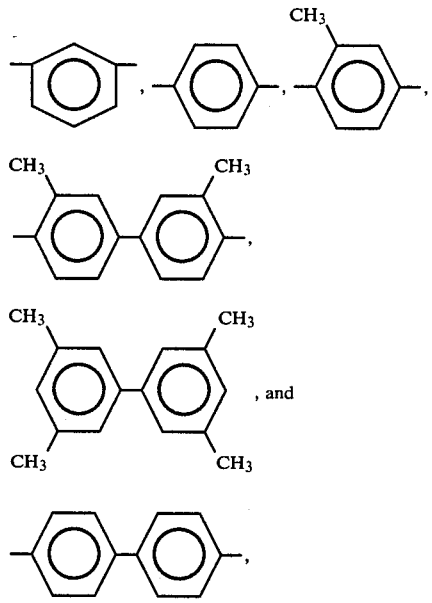

and divalent organic radicals of the general formula,

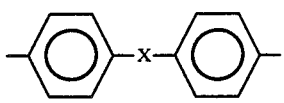

X is a member selected from the class consisting of divalent radicals of the formula,

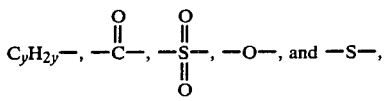

y is an integer from 1 to 5; and $R^1$ is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxanes and divalent radicals of the general formula,

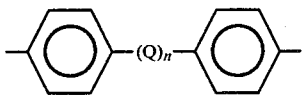

Q is a member selected from the class consisting of

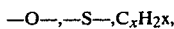

x is an integer from 1 to 5 and n is 0 or 1.

Included by the organic dianhydrides of formula (1) are compounds such as

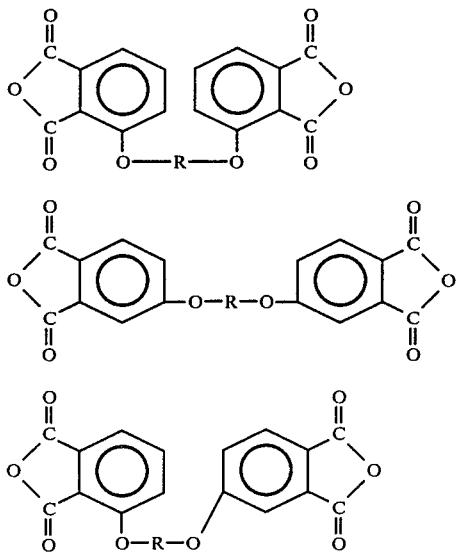

where R is defined above. A preferred form of R is

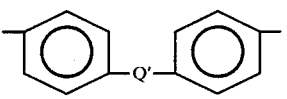

where Q' is selected from

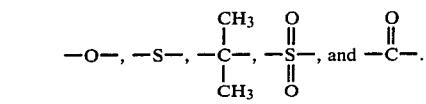

Aromatic bis(ether anhydride)s of formula (1) include for example, 2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride
4,4'-bis(2,3-dicarboxyphenoxy)benzophenone dianhydride;
4,4'-bis(2,3-dicarboxyphenoxy)diphenyl sulfone dianhydride
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)-diphenyl-2,2-propane dianhydride;
etc., and mixtures of such bisether anhydrides Additional aromatic bis(ether anhydride)s also included by formula (1) are shown by M. M. Koton, F. S. Florinski, M. I. Bessonov, A. P. Rudakov (Institute of Heteroorganic Compounds, Academy of Sciences USSR) USSR No. 257,010, Nov. 11, 1969, Appl. May 3, 1967, and by M. M. Koton, F. S. Florinski, Zh. Org. Khin. 4(5) 774 (1968).

Bis(etheranhydride)s preferred herein are: 2,2-bis[4-(2,3-dicarboxyphenoxy)phenyl]propane dianhydride; 2,2-bis[4-(3,4-dicarboxyphenoxy)phenyl]propane dianhydride; 4-(2,3-dicarboxyphenoxy)-4'-(3,4-dicarboxyphenoxy)diphenyl-2,2-propane dianhydride and mixtures thereof.

Mixtures of aromatic bis(ether anhydride)s and up to 30 mole percent based on the total mixture of other aromatic anhydrides, for example, benzophenone dianhydride also can be used.

Included by the organic diamines of formula (2) are for example,
m-phenylenediamine;
p-phenylenediamine;
4,4'-diaminodiphenylpropane;
4,4'-diaminodiphenylmethane(4,4'-methylenedianiline);
benzidine;
4,4'-diaminodiphenyl sulfide;
4,4'-diaminodiphenyl sulfone;
4,4'-diaminodiphenyl ether(4,4'-oxydianiline);
1,5-diaminonaphthalene;
3,3'-dimethylbenzidine;
3,3'-dimethoxybenzidine;
2,4-bis(-amino-t-butyl)toluene;
bis(p-amino-t-butylphenyl)ether;
bis(p-methyl-o-aminopentyl)benzene;

1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylhaptamethylenediamine;
4,4-dimethylhaptamethylenediamine;
2,11-dodecanediamine;
2,2-dimethylropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methlnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane, etc., and mixtures of such diamines.

Organic diamines preferred herein are m-phenylenediamine; 4,4'-oxydianiline 4,4'-methylenedianiline; and mixtures thereof.

Preferable, the polyetherimides made in accordance with the practice of the present invention consist essentially of the following chemically combined units,

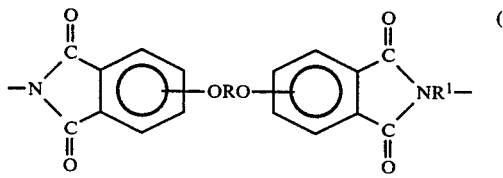

where R and R$^1$ are as previously defined. These polymers can be blended with various fillers, such as silica fillers, glass fibers, carbon whiskers, perlite, etc. The resulting filled compositions can have a proportion of from 1 part to 70 part of filler per hundred part of polyetherimide.

As shown in copending application RD-13291 of Schmidt et al, blending of the organic dianhydride of formula (1) and the organic diamine of formula (2) prior to their copolymerization in an extruder is achieved by separately melting these components and metering them into an extruder. The organic diamine is subject to oxidation which can interfere with polymerization reaction with the organic dianhydride. It is also critical that adequate blending of the reactants is achieved in the proper proportions, particularly since the reaction is fast at the melt temperatures required which can further employ an appropriate chain-stopper such as an organic anhydride.

A principal feature of the present invention is individual feeding of the organic dianhydride reactant and the organic diamine reactant into the extruder to achieve proper degree of controlled polymerization prior to the venting of water of reaction in the mass transfer stage. This accomplished with concentric pipes, a central pipe feeding a melt of the organic diamine of formula (2) and an annular chamber for feeding of the melted blend of organic dianhydride of formula (1) and end cap. Sizing of the central feed pipe and annulus are such that laminar flow is maintained throughout the system, prior to entry into the extruder. Asymmetric location of the central pipe is also possible, but less desirable than the symmetric design which produces balanced flow and uniform heat transfer.

The outer wall of the device of the present invention is so formed as to be connectible to an extrusion chamber. In a preferred embodiment, where a threaded extruder port is provided, the outer surface of the device of the present invention is provided with mating threading to allow the necessary connection. However, obviously, any type of mechanical connection which insures a tight fit is acceptable. The connection means are such that the end of the outer wall of the device is preferably flush with the inner barrel wall of the extruder. Preferably, particularly when a multi-screw extruder is employed, the concentric pipe of the device extends beyond the end of the outer wall of the device and is within the wedge region in the barrel formed between adjoining extruder screws.

With the device constructed as just described, it is possible to feed the two components of the reaction mixture to the extrusion chamber with no significant reaction between the components until mechanical mixing is begun by the extruder screws. Further, because the exiting diamine is surrounded by the dianhydride stream, oxidation of the diamine is prevented. Also, since the lower melting diamine is surrounded by the higher melting dianhydride, this design assures that the central pipe will be free from solids formation and plugging.

In order to more fully define the invention, reference is made to the accompanying drawings, where FIG. 1 is a representational view of a portion of an extruder reactor equipped with a feed pipe, FIG. 2 is an enlarged sectional view of the feed pipe and FIG. 3 is a schematic view of a portion of the feed pipe, and FIG. 4 is a schematic view of an extruder reactor equipped with the feed pipe.

More particularly, FIG. 1 shows a portion of an extruder 10, equipped with a feed pipe 20 connected to the upper wall of the extruder at 11. Feed pipe 20 consists of two concentric tubes 21 and 22, where the lower portion of the outer wall of tube 21 is provided with threads at 23 and a side arm at 24. Feed pipe 20 is joined to extruder 10 by screwing it into the extruder port with mating threads at 11.

In FIG. 2, center tube 22 forms an annular space 25 within tube 21. This annular space produces an annulus which allows the formation of an outer second fluid flow channel and fluid flow path surrounding the central fluid flow path provided by tube 22.

In the context of the present invention, a fluid mixture of an organic dianhydride and chain stopper can be fed into side arm 24 of the feed pipe which connects with annular space 25, while fluid organic diamine or mixture thereof can be fed through tube 22. In this manner, two fluid streams can be isolated from each other until they exit from the feed pipe at 25 and 26. Any means for melting the materials which are fed to the extruder through tube 22 and side arm 24, such as heated tanks and metering pumps (not shown) can be employed.

As previously indicated, the novel feed pipe of the present invention must be so constructed that the flows of the liquid organic dianhydride and organic diamine streams are laminar. The design of concentric feed pipes is based on laminar flow conditions in three critical regions: The orifice from the central tube at 26, the annular channel at 25 and the merging channels beyond (downstream of) the concentric flow paths. Laminar flow, by definition, means that streamlines do not cross. Laminar flow will exist in a channel when the dimensionless Reynolds number, Re, is below 2,100 (Newtonian fluid). For a concentric pipe geometry, the Reynolds number is defined as $$Re = [2R(1-\kappa)\bar{V}\pi]/\mu \quad (4)$$

where R is the inner radius of the outer tube (B/2 in FIG. 3), $\kappa$ is the ratio of the outside diameter of the inner tube to the inside diameter of the outer tube (X/B), $\bar{V}$ is the average fluid velocity, $\pi$ is fluid density at flow temperature, and $\mu$ is fluid viscosity at flow temperature. In the annular region, equation (4) becomes $$Re = \frac{B(1 - X/B)\bar{V}\rho}{\mu} \quad (5)$$

Likewise, for the inner tube $$Re = \frac{A\bar{V}\rho}{\mu} \quad (6)$$

In the merging, downstream channel, $$Re = \frac{B\bar{V}\rho}{\mu} \quad (7)$$

The Reynolds number is the critical design parameter because it combines a geometric factor with material properties and fluid physics. Any combination of these key parameters which result in a Reynolds number below about 2,100 will give an acceptable feed pipe design for reactive fluids in accordance with the present invention.

In FIG. 3, the relationship of the dimensions A, X, and B in the overall design is covered in the above expressions for Reynolds number. Dimension C is important, as it describes the outside boundary of the annular wall. It is preferred to have the inner tube of diameter A extend beyond the annular region as shown by dimension C, if the reactor geometry can accommodate this feature, such as in the case of a twin screw extruder reactor. A less preferred design, but nonetheless acceptable, positions the inner tube A and outer tube B end at the same level which is coincident with the inside wall of the reactor (i.e. C=0 and D=0). A marginal condition exists for D not equal to zero because of the potential for backflow and plugging of the central tube.

In FIG. 4 there is shown a preferred use of the feed pipe in accordance with the practice of the invention in an extruder reactor.

The above definition of the feed pipe pertains to use with all types of continuous and batch reactor vessels, for example, twin screw extruder reactor, single screw extruder reactor, wiped-film reactor, etc. In the case of a twin screw extruder reactor the wedge region in the barrel is the ideal location for the feed pipe because it permits the central pipe to actually protrude beyond the outer pipe. For the other examples listed above, the preferred installation of the feed pipe is flush mounted to the inside wall of the reactor.

A series of runs were made feeding m-phenylenediamine at a temperature of 70° C. into inlet 22 and bisphenol-A dianhydride and end cap at a temperature of 210° C. into inlet 24. The m-phenylenediamine and bisphenol-A dianhydride were used in stoichiometric amounts, and 3 percent phthalic anhydride end cap, based upon the total of reactants, were employed in these runs which, as described in application RD-13291, incorporated herein by reference, used a Werner-Pfleiderer twin screw, co-rotating extruder with intermeshing screws. Each of the extruder chambers had a diameter of 28 mm and the nominal length of the designed stages as shown below in Table I, with the length being shown in mm:

TABLE I

| Stage | Length (mm) |
|---|---|
| 1 | 105 |
| 2 | 135 |
| 3 | 135 |
| 4 | 125 |
| 5 | 150 |

Results are shown below in Table II which indicates the example number, screw speed in rpm, run time in hours, and maximum intrinsic viscosity of the resulting polyetherimide in chloroform, measured in dl/g (Maximum IV):

TABLE II

| Example No | Screw Speed (rpm) | Run Time (Hr.) | Maximum IV (dl/g) |
|---|---|---|---|
| 1 | 200 | ¼ | 0.12 |
| 2 | 200 | ½ | 0.13 |
| 3 | 200 | 2 | 0.15 |
| 4 | 200 | 2 | 0.21 |

The material obtained in Example 1 was further solution polymerized to 0.18 dl/g; similarly, the material in Example 2 was solution polymerized to 0.49 dl/g; and the material in Example 4 to 0.25 dl/g. This indicated that an increased length of extruder would have provided higher intrinsic viscosities than those obtained directly from the extrusion polymerization.

The feed pipe employed for these runs, in accordance with the present invention, had the following dimensions, in inches:

| Dimension | Inches |
|---|---|
| A | 0.148 |
| X | 0.188 |
| B | 0.310 |

The outside diameter 20 of the feed pipe was 0.425 inch.

The flow rate of the m-phenylenediamine was 7.71 cm/min, with $\pi$ having a value of 1.05 gm/cc at 200° C. and $\mu$ having a value of 0.01 cm/cm-sec at 200° C. Employing these values in formula (6) above, a Reynolds number of 4.74 is obtained.

Similar to the calculation above, but employing formula (5), a Reynolds number of 0.70 was obtained for bisphenol-A dianhydride, where $\bar{V}$ is 13.0 cm/min, $\pi$ has a value of 1.05 gm/cc at 200° C. and $\mu$ has a value of 0.10 gm/cm-sec at 200° C.

Obviously, the Reynolds numbers of these two flows were well within the operating conditions required. Since the runs indicated were made without a merging channel downstream of the concentric channels 25 and 26, no calculation was made for the Reynolds number in this region.

Thus, in accordance with the present invention, a novel feed pipe has been described for feeding reactive materials to an extruder reactor.

The extruder to be employed can be any of the extruders generally used for extrusion of plastic materials, but is, preferably, a multi-screw extruder. In that regard, the extruder can have co-rotating screws, and those screws can be tangential or intermeshing. In addition, the extruder can be of the type of device presently marketed under the trade name "Ko-kneader". In fact, though not preferred, the complete extruder as employed in the present invention can be a combination of these types. Obviously, this combination type extruder is not preferred because of the difficulties in assembling and coordinating the various steps.

Thus, in accordance with the present invention, a novel feed pipe has been described for use in feeding highly reactive materials to a reactor so as to prevent interaction of the materials until they are introduced into the reactor chamber. In particular, this device is useful for the polymerization of liquid polyetherimides which consists essentially of the following chemically combined units:

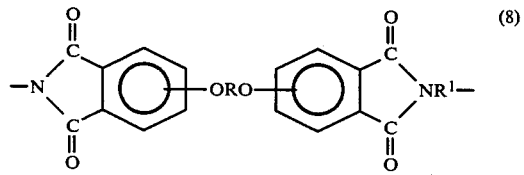

(8)

where R and $R^1$ are as previously defined. These polymers can be blended with various fillers, such as silica fillers, glass fibers, carbon whiskers, perlite, etc. The resulting filled compositions can have a proportion of from 1 part to 70 parts of filler per hundred parts of polyetherimide. There can be polymerized from about 0.5 to 2.5 moles of organic diamine of formula (2) per mole of organic dianhydride of formula (1) to make polyetherimide.

What we claim as new and desire to secure by Letters Patent of the United States is:

1. An apparatus for the polymerization of highly reactive monomers in the liquid state comprising, (A) a feed pipe and (B) a barrel-type extruder reactor, where said feed pipe comprises
   (a) a first hollow tube;
   (b) a second hollow tube within said first hollow tube and extending below the first hollow tube into a feed region of the barrel of the extruder reactor and
   (c) mounting means for positioning said hollow tube on the extruder reactor, wherein the dimensions of (a) and (b) are sufficient to insure laminar flow of said liquid state monomers into said extruder reactor while satisfying the Reynolds number values in the following expression:

$$Re = [2R(1-\kappa)\bar{V}\pi]/\mu$$

thereby achieving a Reynolds number of less than 2100, where R is the inner radius of the outer tube, $\kappa$ is the ratio of the outside diameter of the inner tube to the inside diameter of the outer tube, V is the average fluid velocity, $\pi$ is the fluid density at flow temperature, and $\mu$ is fluid viscosity at flow temperature.

2. An apparatus in accordance with claim 1, where the extruder reactor is a multiple screw extruder.

3. A feed pipe in accordance with claim 1, where said mounting means comprises the outer wall of said first hollow tube which is provided with male threading and said extruder reactor being provided with mating threading.

4. A feed pipe in accordance with claim 1, where said second hollow tube forms a central fluid flow channel located asymmetrically to the first hollow tube.

5. An apparatus in accordance with claim 1 where the second hollow tube is concentric with the first hollow tube.

6. An apparatus in accordance with claim 1 where the barrel-type extruder reactor is a twin extruder reactor.

* * * * *